Nov. 18, 1958     P. J. WEAVER ET AL     2,860,849
APPARATUS FOR FILLING CONTAINERS TO A PRECISE WEIGHT
Filed Sept. 23, 1955     3 Sheets-Sheet 1

INVENTORS
PAUL J. WEAVER
OLIVER R. TITCHENAL
BY
Ward, Neal, Haselton, Orme & McElhannon
ATTORNEYS Nov. 18, 1958    P. J. WEAVER ET AL    2,860,849
APPARATUS FOR FILLING CONTAINERS TO A PRECISE WEIGHT
Filed Sept. 23, 1955    3 Sheets-Sheet 3

INVENTORS
PAUL J. WEAVER
OLIVER R. TITCHENAL
BY
ATTORNEYS.

United States Patent Office 2,860,849
Patented Nov. 18, 1958

2,860,849

APPARATUS FOR FILLING CONTAINERS TO A PRECISE WEIGHT

Paul J. Weaver, Paramount, and Oliver R. Titchenal, Emeryville, Calif., assignors to St. Regis Paper Company, New York, N. Y., a corporation of New York Application September 23, 1955, Serial No. 536,077

15 Claims. (Cl. 249—63)

This invention relates to method and apparatus for filling containers to accurate weight.

In filling containers, such as 100 pound bags of sugar, an error of so small an amount as one-half ounce per bag builds up to a monetary loss of many thousands of dollars per year. In addition, because of standards of accuracy set by law, it is ordinarily necessary to employ a person to watch a weighing scale and make up or subtract enough of the product to meet the standards. When the product is contained in a closed sack filled through a nozzle, this adjustment of weight is such a problem that frequently the filling machinery is set to overfill the bag, and the resulting loss is simply absorbed as an expense.

It is an object of this invention to provide means for filling containers to an accurate weight with a speed commensurate with commercial requirements, and to an accuracy which will meet legal requirements without requiring adjustment after the bag is filled. In fact, it has been found that the means disclosed herein permits a 100 pound bag of sugar to be filled in approximately six seconds to a consistent accuracy of plus or minus one ounce.

This invention is carried out in connection with a load-deflected member which is deflected by the container as the container is filled. The deflection of the member is proportional to the weight of product in the container. A variable orifice member comprising a discharge orifice and a buffeting surface is provided whose separation is determined by the deflection of the beam. A stream of pressurized fluid such as air is discharged from the orifice upon the buffeting surface. The buffeting surface and the orifice are moved toward each other by the deflection. The more the deflection, the closer are the orifice and buffeting surface moved together. This causes a back pressure from the orifice which is proportional to the deflection, and which is also proportional to the weight of the product in the container. This back pressure is then used as a signal to control a system for closing a supply valve in the product supply line. When a back pressure is reached which corresponds to a fully loaded container, the supply valve is closed.

A further feature of the invention resides in filling a container in which a major proportion of the ultimate product weight is quickly supplied to the container at a relatively rapid rate. After the major proportion of the product is dumped in the container, then the flow of product into the container is progressively slowed until finally the rate of flow is sufficiently low at the time the bag is filled to its ultimate weight, that an error in the precise instant of product cut-off of a magnitude such as might result from a lag-time in the operation of the machinery or in a small error in adjustment will result in only a relatively unimportant error in the total weight dumped into the container.

A feature related to the slowing of the filling rate resides in a power valve for actuating a power cylinder which controls the supply valve. According to this invention, movement of the power valve to cause the power cylinder to shut the supply cut-off valve is opposed by the action of the power cylinder which it causes. This provides a feed-back control, in which the rate of flow of material through the supply valve is gradually cut down.

A further feature resides in a unique trigger valve for quick shut-off of the product supply valve, which trigger valve incorporates means for the abrupt amplification of its own signal so as to actuate means controlling the supply valve with optimum speed thereby reducing weight errors which could be associated with extended system reaction times. This trigger valve comprises a body having a diaphragm chamber with a diaphragm therein. Two entry ports are provided into the chamber on the same side of the diaphragm. One entry port is for receiving the back pressure from the variable orifice, and the other is for receiving regulated control pressure air. A needle is affixed to the diaphragm and projects into the regulated control pressure entry port to close said port when pressure is low in the chamber. When back pressure from the variable orifice builds up sufficiently to move the diaphragm, however, the needle is unseated, and regulated control pressure air is admitted into the diaphragm chamber through the regulated control pressure entry port where it rapidly displaces the diaphragm, and the resultant flooding of regulated control pressure air into the chamber provides a rapid actuation of the diaphragm by more forcefully displacing the diaphragm, thereby amplifying and accelerating the operation of the trigger valve.

The above and other features of this invention will be fully understood from the following detailed description and the accompanying drawings, of which.

Machines according to this invention are adaptable to fill many types of containers with substances which are fluid, or which are capable of being "fluidized" for granular flow, perhaps by means of an "air pad." For convenience, this invention will be described in connection with filling a bag of sugar, using air as the working fluid in the machine. It will be recognized that this apparatus and method would also be adaptable to filling other containers, such as cans, bottles, and the like, with liquids or pulverulent solids, such as oils, flour, meal, wheat and the like, as a few examples.

Figure 1:
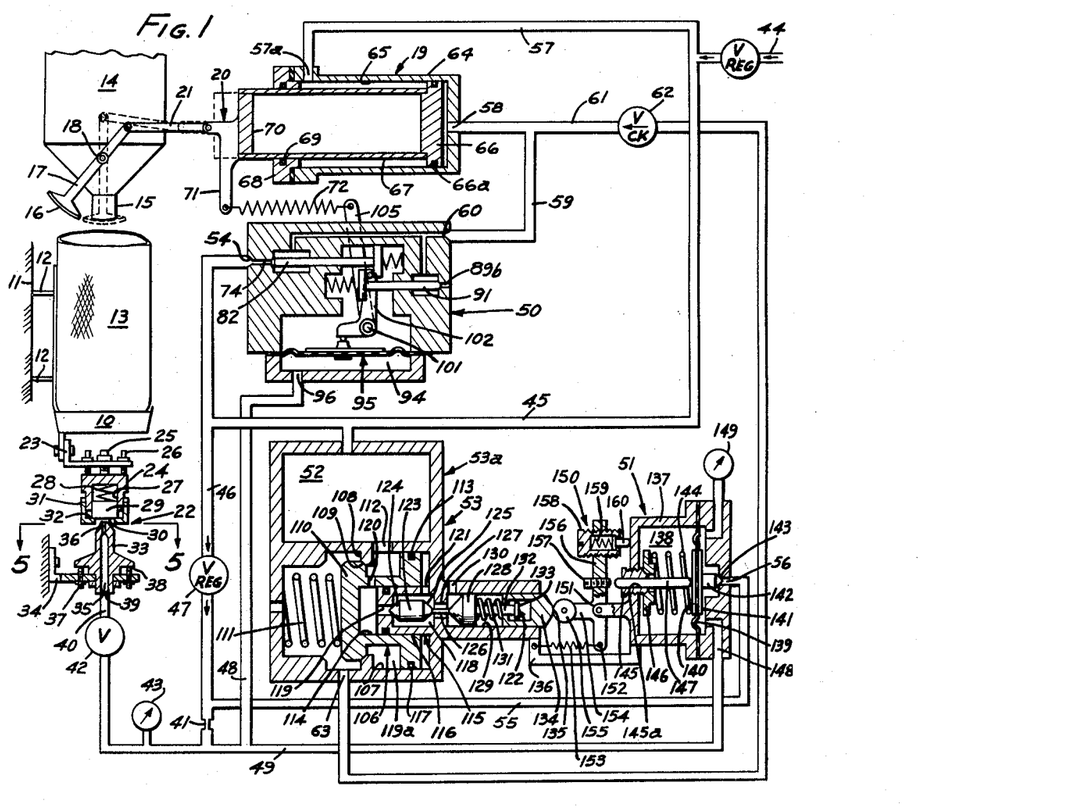
Fig. 1 is a schematic illustration, partly in section and with parts broken away, of one form of apparatus embodying the bag filling machine in accordance with the present invention, a bag holder and bag filling spout being viewed from the side.

This invention utilizes the deflection of a member in response to an applied weight for providing a signal to a control system. For this purpose, a bag chair 10 is connected to a support 11 by means of flexures 12. These flexures may simply be flat metal plates cantilevered from the support, which bend with applied weight. In the practice of this invention it has been found convenient to use steel plates which flex approximately .080 inch upon the application of 100 pounds of weight. A bag 13 to be filled is rested on the bag chair. A hopper 14 having a nozzle 15, or other supply line is disposed over the bag so as to discharge sugar or other material thereinto. A material supply valve which comprises a gate 16 for reducing the throat of the nozzle is mounted to the hopper by an arm 17 which is attached to a pivot 18 so that the gate can be swung across the nozzle to close it by an amount which depends on the position of the arm.

A power cylinder 19 contains a piston assembly 20 which is connected by a link 21 to the arm 17 of the material supply valve. Actuation of the power cylinder will cause arm 17 of the material shut-off valve to pivot and thus open or close the nozzle of the hopper by an amount determined by the position of the piston 20. The object of the control circuit to be described is to move the piston in the power cylinder so as to close the material supply valve at the instant when the bag is filled to the correct weight.

Figures 5, 6:
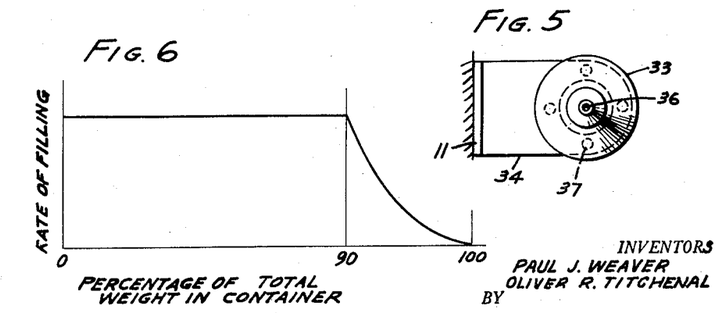
Fig. 5 is a top plan view of a portion of the aforementioned secondary orifice and taken substantially along line 5—5 of Fig. 1.
Fig. 6 is a graph showing the rate of container-loading relative to the total load in the bag, when a container is filled according to this invention.

The control system comprises a pneumatic circuit which has a secondary, variable orifice assembly 22. One part of this variable orifice assembly is attached to the bag chair by flange 23, and a cage 24 is attached to said flange by a bolt 25. Levelling screws 26 in the mounting flange bear against the cage for levelling the same. The cage has a bore 27 for receiving an overtravel spring 28 between the cage and a buffeting member 29. This buffeting member fits snugly and slidably in the bore 27, and has a lower flat buffeting surface 30. A retainer 31 holds the buffeting member in the bore, and a lower inner shoulder 32 on the cage serves to establish a reference level for the buffeting surface. It will be appreciated that the cage and the buffeting surface will move up and down with the bag chair.

The other part of orifice assembly 22 comprises an orifice member 33 which is attached to a mounting flange 34 on support 11. Thus the orifice member does not move up and down with the bag as it is being filled, while the buffeting surface does. Deflection of the bag chair therefore varies the adjustment of the secondary orifice by changing the spacing between the orifice member and the buffeting surface.

The orifice member 33 has a central air passage 35 leading to an accurately formed orifice 36. Levelling screws 37 in the mounting flange 34 are provided for levelling the orifice. A shoulder 38 on the orifice provides bearing points for the levelling screws 37. The orifice member and buffeting surface are adjusted relative to each other so that air from the orifice is discharged precisely perpendicularly upon the buffeting surface. Thus the orifice 36 and buffeting surface 30 together make up the principal elements of the variable secondary orifice 22.

A threaded inlet 39 receives air from conduit 40, which will hereafter be called the "control circuit." This control circuit 40 interconnects the secondary orifice with a primary orifice 41, which primary orifice comprises a restrictor in the air line. A shut-off valve 42 and a pressure gauge 43 are provided in said control circuit 40.

Air is supplied at shop pressure to conduit 44 and proceeds via conduits 45 and 46 to a regulator valve 47 which operates to establish a pre-selected air pressure at primary orifice 41 independently of the rate of air flow through said primary orifice. In practice it has been found advantageous to set this regulator to maintain a pressure of 30 pounds per square inch at the primary orifice.

It will now be seen that a constant pressure is provided to the primary orifice 41, and that the pressure in control circuit 40 will therefore be a direct function of the back pressure which results from the variable spacing between the buffeting surface 30 and the orifice 36 in the secondary variable orifice 22. The pressure in this control circuit 40 is thus proportional to the weight of the bag being filled, and this pressure may be utilized as a signal to indicate when the bag is filled to the desired weight. Pressure in control circuit 40 will be referred to hereafter as the "control circuit pressure."

Control circuit pressure is conveyed through conduits 48 and 49 to a power valve 50 and to a trigger valve 51, respectively. Shop air pressure from conduit 45 is provided to the accumulator 52 of a cut-off valve 53 and also to a power air inlet port 54 of the power valve 50 through a branch of conduit 46. A conduit 55 interconnects a point in conduit 46 located between the pressure regulator 47 and the primary orifice 41, to a high pressure inlet port 56 in trigger valve 51.

A connection is provided from the shop air supply 44 to the retraction port 57a of the power cylinder by means of a conduit 57. The power inlet 58 of the power cylinder is connected by means of a conduit 59 with the power air port 60 of power valve 50 and also to the exhaust port 63 of cut-off valve 53 through a conduit 61 having a check valve 62 therein.

From the foregoing description, it will be appreciated that pressure from the control circuit 40 is provided to the power valve 50 and to the trigger valve 51. The power valve 50 directly controls flow of high pressure air to power cylinder 19, and trigger valve 51 controls the operation of a cut-off valve 53 which comprises an additional source of high pressure air to said power cylinder. It will be apparent from what is to follow that power valve 50 is a feed-back type valve for cutting down the flow rate of product toward the end of the filling operation, while cut-off valve 53 operates to override the feedback control and give a rapid, final closure of the supply valve when the container is accurately filled.

The details of the various valves and their interconnection to actuate the power cylinder at the correct moment for supply valve shut-off will now be described.

A power cylinder 19 comprises an outer shell 64 having a smooth-walled cylinder 65 within. Piston assembly 20 fits in said cylinder, and has an enlarged piston 66 at the right hand end as shown in Fig. 1. An O ring 66a makes a sliding seal between the piston and the cylinder. A piston rod 67 having a lesser diameter than the piston is fixed to the piston, and makes a sliding fit in an end plate 68 which is bolted to the outer shell 64. An O ring 69 seals between the piston rod and the end plate. A plug 70 in the hollow piston rod completes the piston assembly, and it will be evident that the piston assembly is axially shiftable in the cylinder 65.

A small area on the left hand side of the piston is exposed to high pressure air from conduit 57 through retraction port 57a This air pressure will tend to retract the piston assembly toward the right as seen in Fig. 1 when the pneumatic force on the left-hand side of the piston 66 is greater than the pneumatic force on the right hand side of said piston. This provides for the retraction of the piston to the righthand position shown in solid line in Fig. 1. A greater force against the right hand side of the piston moves the piston toward the position shown in dotted line in Fig. 1.

The piston assembly has a depending arm 71 to which a coil spring 72 is attached. The spring will also be attached to a part of the power valve 50 as will presently be disclosed.

Figure 3:
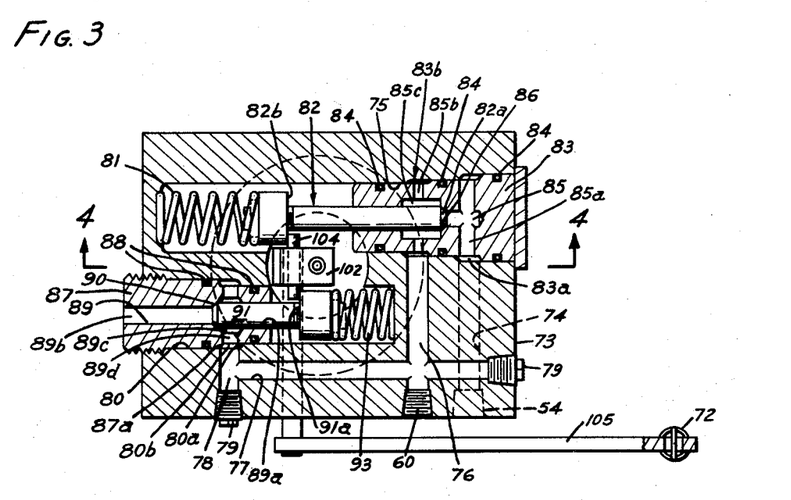
Fig. 3 is a sectional view in detail of a power valve employed in the apparatus of Fig. 1, the section being taken substantially along line 3—3 of Fig. 4.
Figure 4:
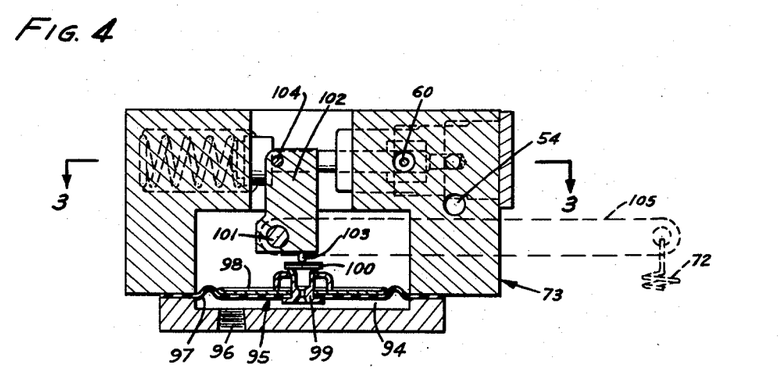
Fig. 4 is a sectional view, partly in section and with parts broken away, the section being taken substantially along line 4—4 of Fig. 3.

The power valve 50 is shown in detail in Figs. 3 and 4 and in a somewhat schematic form in Fig. 1. The power valve has a body 73. A power air inlet passage 74 is drilled in the body so as to intersect a stepped power poppet bore 75. This power air inlet passage 74 is connected to the power air inlet port 54. A power air supply passage 76 is formed by drilling a hole so as also to intersect said power poppet bore 75, and this power air supply passage 76 connects with the power air port 58 of the power cylinder by means of conduit 59. A crossbore 77 is drilled to connect the power air supply passage 76 and a passage 78. The cross-bore 77 and the passage 78 are closed by plugs 79 at the outside of body 73. The passage 78 intersects a stepped exhaust poppet bore 80 which is drilled into the side of the body 73.

In the power poppet bore 75 there is an inlet pressure balancing spring 81 which presses against a power valve poppet 82 having a tapered nose 82a and a shoulder 82b. The spring tends to force the poppet to the right as illustrated in Fig. 3 and is adjustable to balance force on the end of the power poppet.

A power poppet valve seat member 83 in the power poppet bore 75 has a stepped outer surface which leaves annular voids 83a and 83b around the surface of the valve seat member where power air inlet 74 and power air supply passage 76, respectively, intersect the bore 75. O rings 84 are placed between the power poppet valve seat member and the wall of bore 75 on both sides of inlet 74 and passage 76.

This valve seat member 83 has a central bore 85 with a valve seat 86 therein against which the tapered nose 82a of the valve poppet will seat when the poppet is moved against it. A drilled hole 85a in the valve seat member 83 interconnects annular void 83a with central bore 85, and a drilled hole 85b interconnects annular void 83b with the central bore 85. An enlarged chamber 85c is provided adjacent valve seat 86 to give clearance around the power poppet 82. The tapered nose 82a of the valve poppet seats in a line contact at the outside corner of the poppet so as to balance the valve against the spring 81.

Central bore 85, when open, serves to interconnect the power air inlet 74 and the power air supply passage 76, so that when the power valve poppet 82 is withdrawn to the left in Fig. 3 the air can flow from power air inlet port 54 through power air inlet 74, to annular void 82a, through hole 85a, central bore 85, and hole 85b to power air supply passage 76 and power air port 60.

Exhaust poppet bore 80 has a shoulder 80a therein, and accommodates an exhaust poppet valve seat member 87. This valve seat member has a shoulder 87a which, in conjunction with shoulder 80a leaves an annular void 80b around the valve seat member where passage 78 intersects the exhaust poppet bore 80. O rings 88 seal between the member 87 and the wall of bore 80 on both sides of the annular void 80b.

An axial bore 89 through the valve seat member provides a poppet guide 89a which is also a sliding seal and an exhaust port 89b. Between the guide and port is an expanded chamber 89c. A valve seat 90 is formed at the left hand edge of said chamber around the opening of the exhaust port 89b, and a drilled hole 89d interconnects the annular void 80b with said chamber 89c.

An exhaust poppet 91 moves in guide 89a, and when moved entirely to the left as illustrated in Fig. 3, bears on seat 90 and closes the exhaust port 89b. When moved to the right, the poppet opens the exhaust port. An exhaust poppet loading spring 93 presses the exhaust poppet 91 to tend to close the exhaust port 89b. The exhaust poppet has a shoulder 91a facing away from the spring.

A diaphragm chamber 94 is formed in the body, across which there is a flexible diaphragm 95. In the diaphragm chamber, on the lower side of the diaphragm in Fig. 4, there is a control pressure inlet port 96 for admitting control circuit pressure. This diaphragm may conveniently be of any conventional construction, such as a flexible diaphragm sheet 97, a backing member 98, and a grommet 99 for holding the diaphragm parts together. A contact plate 100 is attached to the grommet at the centroid of the diaphragm. This contact plate is preferably disposed horizontally to make contact with a pivot to be described.

A pivot shaft 101 is journaled with ball bearings in the wall of the power valve and extends into a volume above the diaphragm chamber, and a pivot arm 102 (hereinafter called "pivot") is mounted to the shaft. This pivot has a contact point 103 which rests on the contact plate 100. The contact point is eccentrically placed with relation to the pivot shaft so that upward motion of the diaphragm will cause the pivot arm to rotate counter clockwise in Fig. 4. At an upper portion of the pivot 102, is a transverse pin 104 which makes contact with both the shoulder 82b of the power valve poppet, and with the shoulder 91a of the exhaust poppet so that movement of the diaphragm in one direction opens one of the poppets, while one of the springs closes the other. It will be observed that poppets 82 and 91 are balanced against each other by springs 81 and 93 across pivot 102. Both poppets may be closed at the same time when the pivot is in a central position. Contact plate 100 is adjustable upward or downward so that this condition of both poppets closed occurs at a central position of the diaphragm.

A lever 105 is pinned to the pivot shaft 101 outside the valve body so that turning the lever 105 turns the pivot 102. Spring 72 is connected to lever 105 and to the depending arm 71 of the piston assembly 20, thus providing for the feed back of the control signal as described below.

Cut-off valve 53 is provided with a body 53a having an accumulator chamber 52 connected to the shop air supply via conduit 45. Within the valve is a poppet arrangement for quick action of the cut-off valve. This poppet arrangement includes a main flow poppet 106 which is disposed in a main cylinder 107 in the cut-off valve 53. This cylinder extends part-way across the cut-off valve, and terminates at an annular shoulder 108. The lefthand portion of this shoulder 108 has a frusto-conical valve seat 109 which seals with a shoulder 110 on said main flow valve poppet 106 when the main flow poppet is moved entirely to the right in Fig. 1. A coil spring 111 is placed, to the left of the main flow poppet to keep it normally closed. An inlet port 112 admits air to the cylinder 107 from the accumulator 52. An O ring 113 seals between the main flow poppet 106 and the wall of the cylinder 107.

A central cylinder 114 is bored in the right hand face of the main flow poppet 106 to receive a pilot valve assembly 115. This pilot valve assembly comprises a cylindrical valve body 116 which fits snugly within the central cylinder 114 and makes a sealing contact therewith by means of an O ring 117. A pilot chamber 118 in the cylindrical valve body 116 connects with the central cylinder 114 by means of a passage 119, and a passage 120 interconnects the accumulator chamber 52 with the passage 119 through an annular void 119a around the main flow poppet. Pressure from accumulator 52 is thus continuously exerted in passage 119. Passage 121 in the wall of the cylinder body 116 conducts pressure from the pilot chamber 118 to the righthand side of the main flow poppet 106.

A pilot poppet assembly 122 comprises a plug 123 with a first seat 124 thereon for closing passage 119 when the pilot poppet assembly is moved to the left in Fig. 1, and a second seat 125 at the other end of said plug 123. A rod 126 is attached to plug 123 and passes through bleed port 127. This bleed port can be sealed by seat 125 of the pilot poppet when said poppet is moved to the right.

An actuator plunger comprises a rod 126 which has a collar 128 on the other side of bleed port 127 from the plug 123. The collar makes a sliding fit within a cylinder 129. This cylinder 129 is pierced by an exhaust port 130. A coil spring 131 presses against the right hand side of said collar, and surrounds a post 132 with a head 133 thereon which are integral parts of the pilot poppet assembly 122. The post 132 projects into a cage 134 which retains the head 133. The cage can be pressed against the spring 131 to force the pilot poppet to the left and close passage 119. The spring is an over-travel provision to protect the seat 124 on the plug from damage due to excessive closing force. The cage has a contact button 135 on its surface outside the cut-off valve 53, and the cage is slidably fitted in the cylinder 129.

The trigger valve 51 is attached to the cut-off valve 53 by an arm 136. The trigger valve comprises a body 137 with a diaphragm chamber 138 therein. A flexible diaphragm 139 extends across said diaphragm chamber and has a backing plate 140 at its center on the lefthand side in Fig. 1. Another backing plate 141 on the right hand side of the diaphragm has a needle 142 with a seat 143 on its end, for closing high pressure inlet 56 when the diaphragm is forced to the right. A coil spring 144 biases the diaphragm to the right to seat the needle. A threaded plug 145 having a passage 145a therein serves as adjustable mounting means for a spring support 146. A slidable push rod 147 fits in the threaded plug 145.

Conduit 49 connects to a control pressure inlet port 148 leading into the diaphragm chamber 138 on the same side of the diaphragm as the regulated control pressure inlet port 56. A pressure gauge 149 indicates the pressure inside the diaphragm chamber.

A trigger 150 is mounted to the trigger valve by pivot 151, and has a lower arm 152 which a spring 153 pulls in a clockwise direction in Fig. 1. A medial arm 154 has a roller 155 on the end thereof which makes contact with contact button 135 of the cutoff valve. An upper arm 156 of the trigger is equipped with a threaded contact pin 157 disposed opposite the push rod 147 so as to make adjustable contact therewith. The upper arm also has a threaded spring retainer 158 thereon which retains a spring 159 and a push button 160. The push button makes contact with the body of the trigger valve and utilizes the spring 159 as an override provision.

The bag filling system according to Fig. 2 has many of the components described in connection with Fig. 1, to which reference may be had for detailed construction. This system utilizes a power cylinder 19 for controlling a supply valve (not shown), which has a power valve 50 connected thereto in the same manner as set forth in detail with respect to the embodiment of Fig. 1. The distinction between this embodiment and that of Fig. 1 resides in different types of cut-off valving.

An air supply conduit 170 interconnects with the retraction port 57a of the power cylinder 19. Shop air supply is provided via conduit 171 to the power air inlet port 54 of a power valve 50, and also through a conduit 172 to a pressure regulator 173 leading to the primary orifice 41. A conduit 174 conducts shop air to a cut-off valve to be described.

A section of conduit situated between a primary orifice 41 and a secondary variable orifice assembly 22 may be denoted the control circuit 175. The control circuit has a shut-off valve 176 and a pressure gauge 177 therein. Pressure in control circuit 175 will be denoted as "control circuit pressure." Control circuit pressure is supplied to the control pressure inlet port 96 of the power valve 50 by means of conduit 178, which branches from conduit 175. Conduit 178 has a branch conduit 179 leading to a cut-off valve 180, and also a branch conduit 181 leading through a pressure regulator 182 to a starter valve 183.

Starter valve 183 is connected by conduit 184 to the power inlet port 58 of power cylinder 19. Conduit 185 interconnects the power air port 60 of the power valve with said power inlet port 58.

Cut-off valve 180 comprises a body 186 having a diaphragm chamber 187 within. A diaphragm 188 extends across said chamber above the entrance of the conduit 179. This flexible diaphragm is conveniently provided with a pair of backing plates 189, 190, disposed one on each side. A pivot shaft 191 is journaled in the body 186 above the flexible diaphragm 188, and extends into the diaphragm chamber.

A pivot arm 192 (hereinafter called a "pivot") has an extension 193 with a contact point 194 thereon which makes contact with the backing plate 189 so that upward movement of the flexible diaphragm, causes the pivot to move clockwise in Fig. 2. An upper extension 195 of the pivot is pinned to a slide valve 196, which slide valve is restrained by a spring 197 mounted to a tension adjustment screw 198 in the wall of body 186. Therefore the spring 197 opposes upward movement of the diaphragm and tends to move the slide valve to the left.

Slide valve 196 moves axially in a bore 199 which is tapped by a pressure inlet port 200 connected to conduit 174, and by a pressure outlet port 201 which is interconnected by conduit 202 to the starter valve 183. A slot 203 in the slide valve interconnects the pressure inlet port 200 and pressure outlet 201 when the slide valve 196 is moved to the right. Pressure inlet port 200 is closed when the slide valve is moved to the left.

The starter valve comprises a valve body 204 having its pressure inlet 205 connected with conduit 202. The pressure inlet intersects a transverse bore 206 which leads to a pressure outlet 207 past a ball check 208. This pressure outlet 207 is interconnected with the power inlet port 58 of the power cylinder by conduit 184. Transverse bore 206 also connects with a starter chamber 209 within which there is a starter poppet 210. This poppet is spring-loaded open by a spring 211. The starter poppet 210 has a tapered nose 212 which can close the left end of the transverse bore 206 when the poppet is pressed to the right in Fig. 2.

Conduit 181 connects to port 213 and the starter chamber 209, and a ball check 214 is placed in said starter chamber to permit flow to the left.

*Operation of the system of Fig. 1*

The system of Fig. 1 is shown at the start of a filling cycle. A container 13 has been placed atop the bag chair 10, and, since the bag is light and not yet loaded, the flexures 12 are relatively undeflected so there is a relatively wide gap between orifice 36 and buffeting surface 30 in secondary orifice assembly 22. Shop air from conduit 57 has entered the retraction port 57a and has exerted pressure against the left hand side of the piston 66 so as to retract the piston assembly 20 and open the supply valve 16. Material thus flows from the hopper 14 into the bag.

Shop air is conveyed by conduits 45 and 46 to the accumulator chamber 52 of the cut-off valve 53 and through the regulator valve 47 to the primary orifice 41, respectively. Regulated air pressure is conveyed through conduit 55 to the high pressure entry port 56 of the trigger valve. The regulator acts to maintain a constant pressure at primary orifice 41, regardless of the rate of flow therethrough.

Since the gap in the secondary orifice is comparatively large, there is a relatively unobstructed exit of air through secondary orifice 22. Therefore the control circuit pressure in conduit 40 is lower than when the spacing is smaller, and increases as the spacing decreases. Control circuit pressure is exerted through conduits 48 and 49 to the diaphragm chambers of the power valve 50 and the trigger valve 51, respectively, for moving the diaphragms in accordance with control circuit pressure.

As material is placed in the bag 13, the weight thereof deflects the flexures 12 so as to lower the buffeting surface 30 toward the orifice 36, thereby increasingly impeding the exit of compressed air from the orifice. This causes a back pressure and an attendant rise in control circuit pressure in conduit 40. A given filled-bag weight will give a certain deflection of the flexures, and this deflecting causes a definite spacing between the buffeting surface and the orifice. Therefore a consistent back pressure will be arrived at in the control circuit each time the bag is filled. This certain pressure is the signal for cut-off.

The method of filling this bag will be best appreciated from an examination of the graph of Fig. 6, where the rate of filling of the bag is the ordinate and the total weight in the bag is the abscissa. It will be observed a large percentage of the total weight is dumped in at a fast rate. Ninety percent has been found to be the optimum amount to be supplied at high rate. The orifice sizes are so chosen and the various valves of this bag filling machine are so adjusted that the rise in control circuit pressure attendant upon the filling of the bag for this first percentage of capacity has no actuating effect on said valves.

However, as the weight of the bag reaches approximately 90% it is desired to cut down the rate of filling, so that the rate of filling at the end at accurate weight is sufficiently slow that moderate errors in the moment of shutting off the material will not have an appreciable effect upon the total weight in the bag itself. For this reason, the last 10% is supplied at a progressively slower rate, as shown by the righthand end of the graph of Fig. 6.

Power valve 50 is the first valve to be affected by the increasing back pressure in the control circuit 40. The control circuit pressure which is applied to the bottom surface of diaphragm 95 in the power valve exerts enough force after 90% load has been placed in the bag to cause the diaphragm to rise and move the pivot 102 in a clockwise direction as shown in Fig. 1, and in a counter clockwise direction as shown in Fig. 4.

The operation of the power valve with increasing pressure beneath the diaphragm will now be described with particular reference to Fig. 3. It will be appreciated that springs 72 and 81 oppose the upward movement of the diaphragm. When the force on the diaphragm is sufficient to lift it, pivot 102 is turned and pin 104 bears against shoulder 82b of the power poppet to unseat the power poppet 82 and open central bore 85. It will be observed that this movement of the pivot permits spring 93 to seat the exhaust poppet 91 all the more firmly, and that further upward movement of the diaphragm will have no effect upon the exhaust poppet 91. When the power poppet 82 is unseated, shop air, entering through power air inlet port 54, flows through power air inlet passage 74, to the annular void 83a to hole 85a, then through central bore 85, hole 85b to annular bore 83b, and into the power air supply passage 76 to the power air port 60.

Then power air is conveyed through conduit 59 to the power air inlet 58 of the power cylinder 19, where it forces the piston assembly 20 toward the hopper so as to tend to close the supply valve by moving the gate 16 across the nozzle 15. It will be appreciated that the distance the tapered nose 82a of the power poppet is withdrawn from the annular seat 86 will partially determine the pressure supplied to the power cylinder, and thus determine the degree of closure of the supply valve, assuming, of course a sufficient volume of air.

Were the power poppet to be unseated without further control, it would merely close the supply valve without any further control or refinement beyond that of a common off-on valve. Therefore arm 71 and lever 105 are interconnected by spring 72. As the piston assembly 20 is forced from the cylinder, an increasing force is exerted on the spring 72 which in turn is conveyed to lever 105 so as to turn the pivot 102 to reseat the power poppet 82.

The spring 72 is stretched by the extension of the piston assembly, and the tension in the spring is therefore a direct function of the position of the supply valve 16. The lever 105 being connected to the spring 72, is sensitive to the force therein, and exerts a resistive force on the diaphragm tending to resist the opening of the power poppet, and thus to resist the further extension of the piston. In this manner the two forces—one (the pneumatic force on the diaphragm) resulting from control circuit pressure responsive to weight in the container, and the other (tension in the spring) resulting from closure of the supply valve—are compared, and any imbalance between the two will cause a movement of the diaphragm.

When the control pressure is predominant, the diaphragm is moved and opens the power valve to send air to the power cylinder tending to close the supply valve.

The energy supplied to the power cylinder by the air through the power valve extends the piston assembly 20, concomitantly increasing the tension in spring 72, and tending to return the diaphragm to a balanced position to stop the flow of air to the power cylinder.

Since the supply valve is only partially closed, material continues to flow into the container, and thus the back pressure in control circuit 40 continues to increase and tends to open the power valve again. The resulting further extension of the piston and closure of the supply valve increases the force on lever 105, and again tends to balance the diaphragm and shut the power valve. The position of the piston and the rate of flow of material through the supply valve are thus directly "tied" to each other, and the more the piston is extended the slower is the rate of flow. The position of the piston is also a function of the percentage of weight filled in the container, so that the closer the bag is to being filled, the slower is the rate of flow.

The closing of the supply valve does not occur in stop and starts, but as a continuous operation, and at a rate in pounds per second, which is inversely proportional to the pounds of material in the container. The more gradual the flow of the material, the more gradual is the closure rate of the supply valve. Thus, near the end of the bag filling operation, a minute "dribble" flow occurs.

Most bulk material has a point of "no flow" at which it does not pour even though the supply valve is partially open. An impasse would result if material flow came to a halt before the bag were filled, or before spring 72 were stretched to an extent corresponding to full weight. The target weight must be reflected by a corresponding target control circuit pressure, and this pressure could never be reached if no-flow conditions occur, because the control pressure is, in effect, balanced against spring 72. It is, therefore, necessary to adjust the target control circuit pressure to a value which will consistently permit some flow through the supply valve. It is also advisable to set this value at a level where the material will consistently have a low flow rate and not erratically reach a no-flow condition.

The operation of the power valve to cut down the filling rate becomes effective at the preselected percentage of bag-filling, and this percentage may be adjusted by means of the coiled spring 72, which holds the power poppet valve closed until force on the diaphragm due to control circuit back pressure is sufficient to overcome it. After that point, the above-described feed-back arrangement cuts down the rate of flow as shown in Fig. 6.

In order to finally cut off the flow of material into the container at the target weight, the trigger valve 51 and the cut-off valve 53 are provided. The purpose of the trigger valve 51 is to actuate the cut-off valve 53 as rapidly as possible and by-pass power valve 50 and its feed-back provisions. Control circuit pressure is conveyed via conduit 40 to the diaphragm chamber of the trigger valve, while regulated control air pressure from the pressure regulator 47 is supplied via conduit 55 to the regulated control pressure inlet port 56 of the trigger valve. It will be observed that by virtue of the loading due to spring 144 the diaphragm forces the needle 142 to close the regulated control pressure inlet 56.

The loading of spring 144 is adjusted by the plug 145 so that when the pressure in the control circuit corresponds precisely to the target weight, the pressure in the diaphragm chamber is sufficient to move the diaphragm to unseat the needle. When the regulated control pressure inlet is opened, regulated control pressure air from the conduit 55 enters and raises the pressure in the diaphragm chamber higher than the control circuit and causes the diaphragm to move rapidly away from said port, thus abruptly amplifying the signal and causing a more rapid and forceful movement of the diaphragm. This causes the push rod 147 to strike the contact pin 157, thereby moving the trigger 150 counter clockwise as shown in Fig. 1. This causes the roller 155 to move down relative to the contact button 135 and starts the cut-off valve in operation.

The cut-off valve is shown in repose in Fig. 1. In this condition, pressure in the accumulator chamber 52 is exerted on the left hand face of the larger end of the main flow poppet 160 so as to move this poppet to the right and moves the shoulder 110 on the main flow poppet against valve seat 109 to close main cylinder 107 and hold the pressure in the accumulator.

The pilot poppet 122 is firmly seated in passage 119 so as to retain the air within the accumulator chamber, so long as the trigger presses on contact button 135.

When the trigger valve moves the trigger so as to release the contact button 135, the pressure of air against the seat 124 of the pilot poppet causes the pilot poppet to be moved to the right, so as to open passage 119 and close bleed port 127. This permits air to flow from accumulator chamber 52 through passages 120, 119 and 121 to the right hand face of the main flow poppet 106. This pressure causes the main flow poppet to move to the left off of valve 109, and permits the rapid flow of air from accumulator 52 through port 63 and conduit 61 to the power cylinder 19. This additional surge of high pressure air causes the piston assembly 20 to move rapidly toward the hopper and rapidly shut the supply valve.

It will be observed that the trigger valve and the cut-off valve by-pass the feed-back provision as provided by spring 72 to the power valve and therefore shut off the supply valve without any diminution of effect due to feed-back. In addition, regulated control pressure air from conduit 55 passes through high pressure inlet port 56, out control pressure inlet port 148, and into the control circuit 40, which raises the control circuit pressure to a value which also causes the power valve to remain open.

The filled bag may now be removed from the bag chair, and although this will increase the spacing at the variable secondary orifice assembly 22 the supply valve will not be reopened until the system is reset. This will be appreciated from a consideration of the condition of the cut-off valve 53 wherein the main flow poppet 106 will be pressed to the left to leave port 63 in communication with the accumulator so long as pilot poppet assembly 122 leaves passage 119 open.

In addition, the regulated control pressure air which enters the trigger valve through port 56 passes to the control circuit 40 via conduit 49. This maintains the control circuit pressure high enough to keep the power valve also open. The leak through the secondary orifice is not great enough to bleed down the control conduit under these circumstances, since air entering through conduit 49 by-passes the primary orifice, and is present in sufficient quantity to keep the pressure up.

Thus, both the power valve and the cut-off valve will remain open, so as to keep the material supply valve closed until the trigger valve is manually reset.

The only way to establish another bag-filling cycle is to manually press the trigger so that roller 155 contacts the button 135 and moves the pilot poppet 122 to close passage 119. Simultaneously, this opens bleed port 127 which bleeds the pressure to the right of the main flow poppet, and permits the main flow poppet to be moved to the right so as again to seal valve seat 109.

The roller 155 will hold the pilot poppet to close passage 119 by force exerted on spring 131. By taking advantage of the over-travel spring 159 in the trigger, the contact pin 157 pushes against the push rod 147 so as to reseat the needle 142 in port 56, and this cuts off the supply of regulated air to the diaphragm chamber in the trigger valve and hence to the control circuit. Holding the trigger momentarily in this position permits the control pressure in control circuit 40 to bleed down through the secondary orifice to its proper value for any unfilled bag.

In this condition, the flow of air from the accumulator 52 to the power cylinder is stopped, and the air behind the piston in power cylinder 19 is bled through port 89b in the power valve so that the piston is retracted by pressure introduced into retraction port 57a and flow of material into the bag is begun again, since retraction of the piston opens the supply valve through spring 72. Thus it will be seen that each time a cycle is to be reinstituted the trigger on the trigger valve must manually be reset, and the rest of the cycle is automatic. Removing manual force from the trigger at this time will leave the trigger valve in the cocked position as the push rod will now not be exerting any force thereon.

Figure 2:
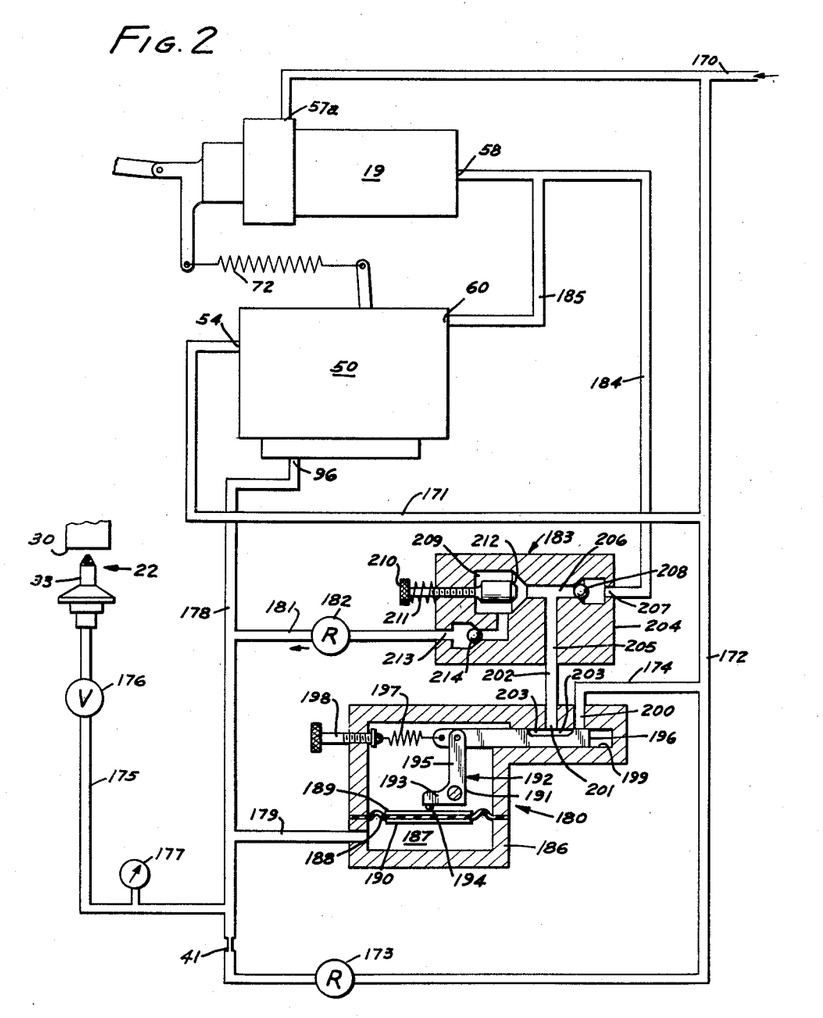
Fig. 2 is a further schematic illustration, partly in section and with parts broken away, of another embodiment of the invention, certain of the sections being in a vertical plane.

*Operation of the system of Fig. 2*

The system of Fig. 2 operates in substantially the same manner as that of Fig. 1 except that a different cut-off valve and a different starter means are provided. The orifice 36 in this case is approached by the buffeting surface 29 as the load is increased on the bag chair so as to raise the control pressure in the control circuit 175. Shop air is supplied to conduits 170 and 172 through pressure regulator 173 to primary orifice 41. Thus a constant pressure is maintained at primary orifice 41, and the pressure in the control circuit is a function of the weight in the container which is being filled.

As the pressure in the control circuit increases, the power valve 50 is the first valve of the system to be actuated, and its actuation is precisely as described in connection with the system of Fig. 1.

As the weight in the bag passes 90%, or whatever other percentage has been selected for rapid-filling, the power valve 50 begins to close the supply valve, utilizing the feed-back provisions of the system of Fig. 1, and following the characteristics of the curve of Fig. 6.

When the target pressure is reached control circuit pressure in diaphragm chamber 187 will have overcome spring 197 so that slide valve 196 will interconnect pressure inlet port 200 to pressure outlet port 201 through slot 203. Spring 197 can be pre-loaded by screw 198 so that this interconnection occurs at the target pressure.

This air in conduit 202 unseats ball check valves 208 and 214 so that high pressure air flows through conduit 184 to power cylinder 19 to finally extend the piston assembly 20 and close off the supply valve 16.

One feature of this combination of valve 180 and 183 is the self generating action (similar to the trigger valve) of the air pressure in the control circuit and chamber 187 at the instant some air passes check valve 214 so as to accelerate the rise of the diaphragm.

In this condition air continues to flow past ball check valve 214 and out port 212 to regulator 182. This provides a supply of regulated air to diaphragm chamber 187 and also to the diaphragm chamber in the power valve 50. This maintains the air pressure on in the power cylinder 19 regardless of the fact that the container will have been removed from the bag chair and that more air will be bled through the secondary orifice.

To restart the system when another bag or container has been placed on the bag chair, starter poppet 210 will be pressed to close the transverse bore 206. This stops flow of air through the regulator 182 to conduit 178. The diaphragm chambers in the power valve 50 and in the cut-off valve 180 will bleed through the secondary orifice assembly 22 so that these valves are returned to their initial condition. This closes the power valve 50 and also causes the slide valve 196 in cut-off valve 180 to move to the left to shut off the conduit 174. Pressure in power cylinder 19 is bled through port 89b of the power valve past the exhaust poppet, and the piston is retracted by virtue of pressure supplied to the retraction port 57a, which opens the supply valve. Thus pressing plunger 210 starts a new filling operation. Subsequent releasing of plunger 210 has no effect as the supply of air to passage 206 is cut off by slide 196.

Check valve 208 prevents pressurized air from passing through the starter valve to the control circuit and thus open the power valve. Check valve 214 prevents control conduit pressure from being lost through the starter valve to the power cylinder.

The advantages of filling a bag at rates according to Fig. 6 are apparent. The first major portion of the load may be quickly supplied to the bag, and filling time thus cut down. In fact, utilizing this technique, bags can be filled faster than with conventional techniques in which the entire bag filling operation must be conducted at a lower rate to minimize the errors to be discussed below. A secondary orifice assembly as set forth above, in which chair movement is about .080 inch, is not particularly responsive to create back pressure except over the last .008 inch. Thus, the major portion of the material may be dumped into the container without any effect caused by the control circuit.

After the major portion has been supplied, the rate is progressively cut down. This leaves the filling rate as high as possible even during the supplying of the last increment. However, very near the target weight, the rate of flow of material is markedly diminished to almost a "dribble." Then the supply valve can finally be closed on a dribble, rather than on a full flow.

Closing off a dribble has several advantages, which are associated with tolerances of machinery of this type:

1. Constancy of rate of flow
2. Signal pickup accuracy
3. Time for transmission of the signal.

If the rate of flow of material at a given supply valve setting were constant, then a container could be filled accurately merely by means of calculating a filling time and clocking the operation of the apparatus. Furthermore, cut-off operation could be made as slow as desired, so long as the time for the operation were constant, along with the flow rate. However, bulk materials do not ordinarily flow at a very constant rate, and it is therefore necessary to have an apparatus which is responsive to actual filled weight, so that variations in flow rate will not be directly reflected by errors in the filled weight.

Assuming that the flow rate were constant, then the matter of signal pickup accuracy and transmission time become important, for when target pressure is reached, any delays in shutting off the supply valve will cause an inaccurate weight.

This invention, by providing a slow rate of filling at target weight permits of slight inaccuracies in signal pick-up and transmission time, since the flow at a dribble rate which will occur in the fraction of a second transmission lag, for instance, will be small, and can be made negligible.

By providing the sensitive, abruptly amplified trigger valve, the target signal is sensitively received and transmitted to a cut-off valve in a minimum time. Then when the shut-off time is greatly reduced, the flow rate can vary widely, with only negligible errors in filled weight. The transmission time can be minimized by keeping the line from the cut-off valve to the power cylinder of large diameter, short in length, and unobstructed by bends and the like.

This invention can also be used with standard beam type scales, for example, still being within the spirit of the invention, and comprising "deflection means" for the bag chair.

This invention is not to be limited by the embodiments shown in the drawings and described in the description which are given by way of example and not of limitation, but only in accordance with the scope of the appended claims.

We claim:

1. Apparatus for filling a container with a predetermined weight of material comprising: container support means for supporting such container while being filled, said container support means including deflection means which are movable in response to the weight of material in the container; a control circuit conduit; primary orifice means connected to said conduit for discharging therein; regulator means connected to said primary orifice means for regulating the pressure of fluid directed to said primary orifice means; secondary orifice means including a secondary orifice member and a buffeting surface member, the latter member normally being spaced from the orifice of said secondary orifice member, in operation such secondary orifice discharging fluid under pressure against said buffeting surface member, one of said members being stationary and the other being attached to and movable with said container support means, the spacing between said members thus being variable in response to deflection of said deflection means occurring in response to the weight of material filled into the container thereby variably to impede the flow of fluid through such secondary orifice, the pressure in said control circuit conduit thus being variable in response to the degree of impeding of such flow of fluid; means for supplying material to such container; a material supply valve for controlling the flow of such material to the container; and means for opening and closing such supply valve including: the power cylinder having a slidable piston assembly therein, the extension of said piston assembly from a norm position being responsive to fluid pressure in said power cylinder, means for interconnecting such piston assembly and said supply valve whereby the latter can be opened and closed as aforementioned, power valve means connected to said power cylinder for supplying fluid under pressure to the latter in response to the occurrence of a selected fluid pressure in said control circuit conduit, feedback means operatively interconnecting said piston assembly and said power valve means for opposing the flow of fluid to said power cylinder in response to movement of said piston assembly by fluid controlled by said power valve means, and cutoff valve means connected to said power cylinder for controlling a flow of fluid under pressure to said power cylinder in response to a selected pressure in said control circuit conduit occurring in response to a preselected weight of material in the container.

2. Apparatus according to claim 1 in which the power valve means comprise a body with a diaphragm chamber therein, a diaphragm across said chamber, said body having an inlet to the chamber on one side of the diaphragm for admitting pressure from the control circuit conduit, a pivot shaft journaled in the body and extending into said diaphragm chamber, a pivot attached to said shaft and bearing against said diaphragm, whereby movement of the diaphragm rotates the pivot and the shaft, valve means opened by rotation of the pivot for passing pressurized fluid to the power cylinder, and a lever outside the body attached to the pivot shaft for turning said shaft, and in which the feed-back means comprises a spring interconnecting said piston assembly and said lever, said spring tending to pull said lever to close said valve means as the piston moves to close said supply valve.

3. Apparatus according to claim 2 in which the cut-off valve means comprise a body having a main cylinder therein, a first valve seat at one end of said main cylinder, a main flow poppet having an axial, central cylinder at one end thereof, an annular void around its periphery, and a passage interconnecting said annular void and central cylinder, a piston on the said main flow poppet slidably fitted in said main cylinder, a second valve seat on said main flow poppet adapted to close the said first valve seat in one position of the poppet, said body being pierced by an entry port and an exhaust port on opposite sides of said first valve seat, a pilot poppet assembly comprising a valve body insertable in said central cylinder having a pilot chamber therein, a first passage interconnecting said central cylinder and pilot cylinder, a passage interconnecting said pilot chamber with one face of said main flow poppet, and a bleed port interconnecting the pilot chamber and the outside of the body, a plug in said pilot chamber so disposed and arranged as to close the passage between the central cylinder and pilot chamber in one position, and to close the bleed port in another position, whereby shifting the plug to open said passage into the pilot chamber admits pressurized fluid to move the main flow poppet and open said valve seats to permit flow of fluid to actuate the power cylinder, and whereby moving said plug to close said passage permits fluid to pass through the bleed port and also to move the poppet to close the seats and stop flow of fluid through the cut-off valve.

4. Apparatus according to claim 3, in which the cut-off valve means are actuated by a trigger valve responsive to a target pressure in said control circuit conduit corresponding to a container filled to a predetermined weight, said trigger valve comprising a body having a diaphragm chamber therein, a control pressure inlet port and a high pressure inlet port entering said diaphragm chamber, a diaphragm across said chamber, said ports both discharging on a single side of said diaphragm, a needle on said diaphragm directed toward and insertable in said high pressure inlet port for closing the same, springing means for biasing the diaphragm to normally hold the needle in said high pressure inlet port, and a push rod movable by the diaphragm in response to movement of said diaphragm, whereby target pressure from said control circuit conduit moves the diaphragm to unseat the needle and open the high pressure inlet port, whereupon high pressure fluid enters the diaphragm chamber to abruptly move said diaphragm and move the push rod to actuate cut-off valve means for shutting off the supply valve.

5. Apparatus according to claim 4, wherein said trigger valve has a trigger which in one position rests against means connected to the plug so as to close the passage into the pilot chamber and thus close the cut-off valve and which, when struck by said push rod, is dislodged from said first-named position to allow the plug to open said passage and close the bleed port to open the cut-off valve.

6. In apparatus for filling a container with a predetermined weight of material wherein a supply line has a valve actuated by a piston slidably mounted in a power cylinder, and wherein a control signal is provided by back pressure in a control circuit conduit in which pressure is determined by the provision of a regulated pressure to a primary orifice and the varying of pressure in the conduit determined by the variable spacing in a secondary orifice which is proportional to the weight in the container, a power valve for supplying pressurized fluid to said power cylinder, comprising: a body with a diaphragm chamber therein, a diaphragm across said chamber, said body having an inlet to the chamber from said control circuit conduit, a pivot shaft, a pivot attached to said shaft so as to be rotatable in said diaphragm chamber, said pivot bearing on the diaphragm at a point which is eccentric to said shaft, and power valve means openable by rotation of the pivot in response to movement of the diaphragm, whereby control circuit pressure, when sufficiently high, opens the power valve means to actuate the power cylinder.

7. Apparatus according to claim 6 in which the shaft is rotatable and the pivot is fixed thereto, and in which a lever is attached to said shaft outside the body so as to be turnable and to turn the pivot, and in which a spring joins the piston and the lever so that actuation of the power cylinder tends to close the power valve.

8. Apparatus according to claim 6 in which the power valve is a poppet so disposed and arranged as to be opened as pressure on the diaphragm is increased, and in which an exhaust poppet valve is provided which is so disposed and arranged as to be opened when pressure on the diaphragm is beneath that required to open the power poppet.

9. Apparatus according to claim 8 wherein a trigger valve has a trigger which in one position rests against means connected to the plug so as to close the passage into the pilot chamber and thus close the cut-off valve and which, when struck by said push rod, is dislodged from said first-named position to allow the plug to open said passage and close the bleed port to open the cut-off valve.

10. In apparatus for filling a container with a predetermined weight of material wherein a supply line has a valve actuated by a piston slidably mounted in a power cylinder, and wherein a control signal is provided by back pressure in a control circuit conduit in which pressure is determined by the provision of a regulated pressure to a primary orifice and the varying of pressure in the conduit determined by the variable spacing in a secondary orifice which is proportional to the weight in the container, deflection means for varying said spacing comprising a substantially flat plate rigidly attached to a support, and a chair for supporting the container, said chair being itself rigidly supported by the plate.

11. Apparatus according to claim 10 in which the deflection means comprise a plurality of substantially parallel flat plates.

12. In apparatus for filling a container with a predetermined weight of material wherein a supply line is provided with a valve actuated by a piston slidably mounted in a power cylinder, and wherein a control signal is provided by back pressure in a control circuit conduit in which pressure is determined by the provision of a regulated pressure to a primary orifice means having a primary orifice and by the varying of pressure to said conduit determined by a variable spacing of portions of a secondary orifice means having a secondary orifice, which latter spacing is proportional to the weight of material in the container, deflection means for varying said spacing and including a plurality of substantially parallel flat plates rigidly attached to a support, a chair for supporting the container, said chair being in turn supported by said plates, said secondary orifice means including a portion which is attached to said chair, the remaining portion thereof being mounted stationarily relative thereto, deflection of said chair so varying the spacing of such portions of such secondary orifice means in proportion to the weight in the container.

13. Apparatus for filling a container with a predetermined weight of material, including in combination: container support means for supporting such container while being filled, said container support means including deflection means which can be moved in response to the weight of material received in said container; means for supplying material to the container; a supply valve for controlling such supply of material to said container; a control circuit conduit; primary orifice means connected for discharging into such conduit; pressure regulator means for supplying fluid at a selected pressure to said primary orifice means; secondary orifice means including a secondary orifice member having a secondary orifice and a buffeting surface member having a buffeting surface, the secondary orifice normally being positioned for discharging fluid under pressure against the buffeting surface, one of said members being stationary and the other being movable with said container support means, the spacing between said members thus being variable in response to the weight of material loaded into the container and also the deflection of said deflection means, the flow of fluid through the secondary orifice being variably impeded also in response to the deflection of said deflection means and thereby varying the pressure in said control circuit conduit; and means for opening and closing said supply valve including: a power cylinder having a piston assembly slidably mounted therein, the movement of the latter from a norm position being responsive to fluid pressure in the power cylinder, means for interconnecting said supply valve with said piston assembly, power valve means connected to said power cylinder for controlling a flow of fluid under pressure to the latter cylinder, said power valve means being operatively connected to said control circuit conduit for controlling such flow of fluid in response to an increasing pressure in the control circuit conduit, feedback means operatively interconnecting said piston assembly and said power valve means for opposing the supply of fluid to said power cylinder in response to movement of said piston assembly by fluid under the control of said power valve means, cutoff valve means connected to said power cylinder for controlling a flow of fluid under pressure to said power cylinder in response to a fluid pressure in said control circuit conduit occurring in response to a predetermined weight of material in the container, said cutoff valve means including a valve body having a diaphragm chamber therein with a control circuit inlet discharging therein and a diaphragm across such chamber, a movable member operatively connected to said diaphragm for movement in response to movement thereof, said valve body also having an inlet port and an outlet port, a valve movable by said movable member for interconnecting said ports at one position thereof, and spring means for opposing the movement of said valve toward such position.

14. Apparatus according to claim 13 in which the valve in the cut-off valve means is a slide valve.

15. Apparatus according to claim 14 in which a starter valve is provided for interconnecting said cut-off valve means and said power cylinder, said starter valve having a body, a transverse bore having a starter chamber and a check means therein, said outlet port of the cut-off valve means discharging into said transverse bore, said transverse bore discharging into said power cylinder with the check means between said outlet port and the power cylinder, said starter valve body also having a port discharging from the starter chamber to the control circuit conduit, a poppet in said starter chamber to close the same, a check means in said port, and a regulator between said starter chamber and the control circuit conduit, said starter chamber being disposed between the outlet from the cut-off valve means and the control circuit conduit.

References Cited in the file of this patent

UNITED STATES PATENTS

| | | |
|---|---|---|
| 769,697 | Jordan | Sept. 13, 1904 |
| 2,408,842 | Garretson et al. | Oct. 8, 1946 |
| 2,544,734 | St. Clair | Mar. 13, 1951 |
| 2,605,075 | Brown | July 29, 1952 |
| 2,634,082 | Knobel | Apr. 7, 1953 |
| 2,670,920 | Meadors | Mar. 2, 1954 |
| 2,751,181 | Baldwin | June 15, 1956 |